United States Patent [19]

Mester

[11] Patent Number: 5,003,541
[45] Date of Patent: Mar. 26, 1991

[54] METHOD AND CIRCUIT FOR SEMICONDUCTOR MEMORY PROCESSING OF VIDEO SIGNALS WITH REED-SOLOMON ERROR DETECTION

[75] Inventor: Roland Mester, Darmstadt, Fed. Rep. of Germany

[73] Assignee: BTS Broadcast Television Systems GmbH, Darmstadt, Fed. Rep. of Germany

[21] Appl. No.: 309,697

[22] Filed: Feb. 10, 1989

[30] Foreign Application Priority Data

Feb. 11, 1988 [DE] Fed. Rep. of Germany ....... 3804175

[51] Int. Cl.⁵ ............................................. G06F 11/10
[52] U.S. Cl. .................................. 371/40.1; 358/336; 360/38.1
[58] Field of Search ...................... 371/40.1, 40.2, 37.2, 371/38.1, 39.1, 37.1; 360/38.1, 53, 48; 358/336, 339, 314, 327, 33; 365/200

[56] References Cited

U.S. PATENT DOCUMENTS

| | | | |
|---|---|---|---|
| 4,426,698 | 1/1984 | Pargee | 371/40.1 X |
| 4,464,753 | 8/1984 | Chen | 371/40.1 |
| 4,660,200 | 4/1987 | Okamoto | 371/37.1 X |
| 4,694,456 | 9/1987 | Morita | 371/40.1 |
| 4,775,978 | 10/1988 | Hartness | 371/40.1 |
| 4,775,979 | 10/1988 | Oka | 371/40.1 X |
| 4,866,719 | 9/1989 | Morgan | 371/40.1 |
| 4,882,732 | 11/1989 | Kaminaga | 360/38.1 X |

Primary Examiner—Jerry Smith
Assistant Examiner—Robert W. Beausoliel
Attorney, Agent, or Firm—Frishauf, Holtz, Goodman & Woodward

[57] ABSTRACT

The active portion of every television line of a digital video signal is used to generate checked data according to a Reed-Solomon block code, line-sequentially with the data of the digital video signal. The Reed-Solomon check data are then added in the horizontal blanking intervals of the digital video signal for error detection and correction processing, so that there is no necessity to provide additional memory circuits in parallel to the memory used to store temporarily the video data of the active portion of television lines. The semiconductor memory distributes the digital video signal data of the active portion of each line by cyclically allocating the data words thereof to n data word planes to form a data block. A Reed-Solomon coder is provided for each plane of the memory and likewise a Reed-Solomon decoder for the read-out of each plane, the check data for each plane being stored in their respective planes during the blanking interval following the active line. The digital video signal data and check data are read-out line sequentially from the semiconductor memory. Error location and error correction is carried out in each memory plane. Error concealment is provided for uncorrectable but located errors.

12 Claims, 6 Drawing Sheets

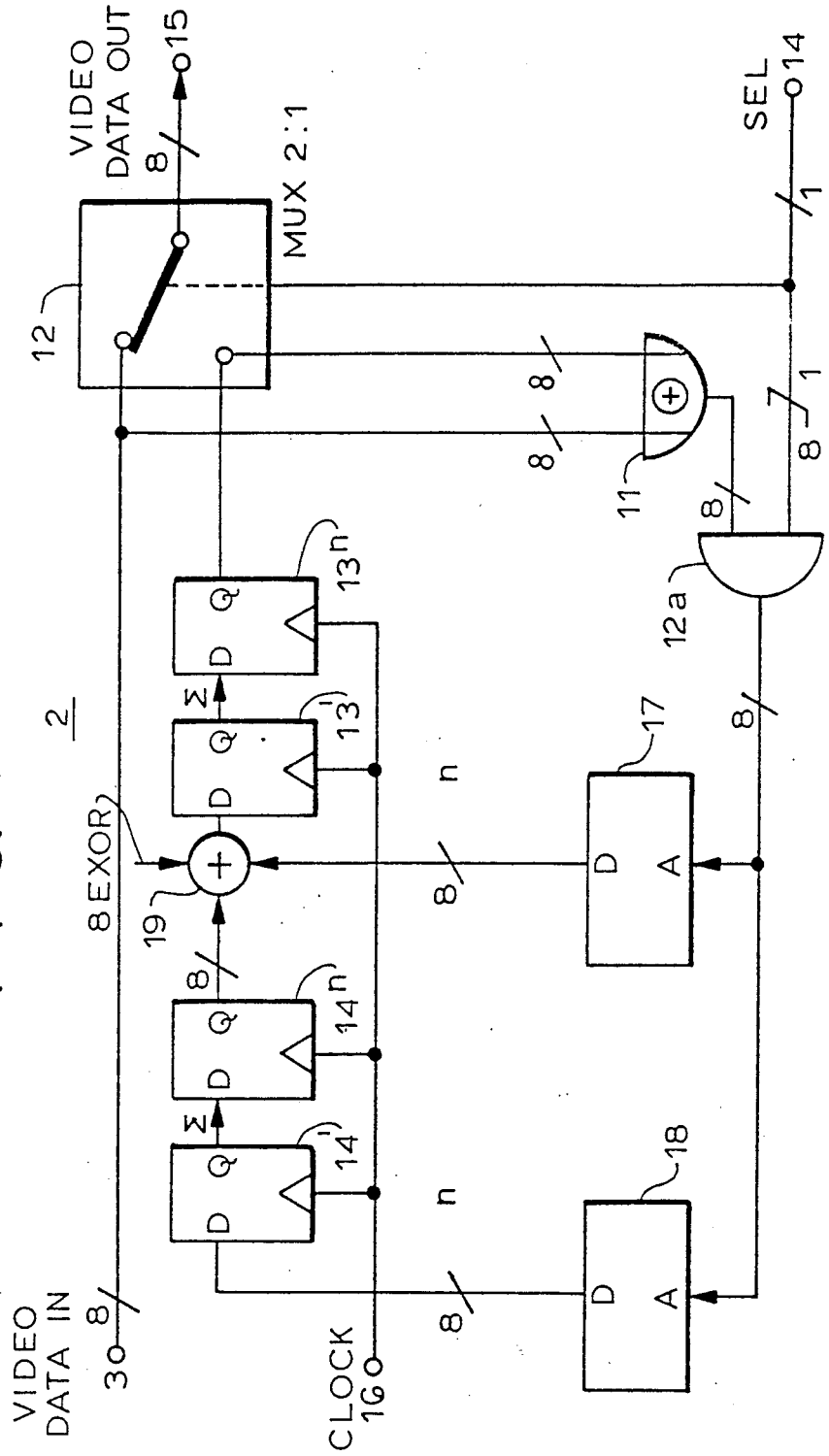
F I G. 4

METHOD AND CIRCUIT FOR SEMICONDUCTOR MEMORY PROCESSING OF VIDEO SIGNALS WITH REED-SOLOMON ERROR DETECTION

Cross-reference to related application: Roland Mester, U.S. Pat. No. 4,918,131, issued Apr. 3, 1990.

This invention concerns processing of digital video signals by, a semiconductor memory into which the signals are written and out of which they are later read out. More particularly, the invention concerns processing in such a memory which is extensive enough to facilitate slow motion and rapid motion reproduction of television scenes and in which it is possible to detect portions of the memory which are or become defective.

A dynamic memory for storing a single picture field which is a fraction of a complete video picture, from which it is possible to provide a still picture reproduction by repeated reading of the stored picture field was disclosed in German published patent application (OS) 34 08 972.

In order to represent the course of picture motion in slow motion or rapid motion tempo it is necessary to write video signals into a memory holding several hundred complete video pictures and to read the signals out in a picture sequence which is different from that used for writing in. A digital semi-conductor memory suitable for such a mode of operation requires memory writing and reading capacity of several gigabits per minute. For technological reasons, therefore, magnetic disk memories were heretofore predominantly used for such purposes.

In the periodical "Radio Mentor", 1967, Issue 7, pages 526 and 527, a slow motion and rapid motion equipment of this kind utilizing a magnetic disk memory is described. In this known slow motion and rapid motion equipment a lack of picture steadiness and insufficient operation reliability resulting from the use of mechanical parts subject to wear is a substantial disadvantage. Furthermore, that known equipment permits only 900 video pictures to be recorded in an analog manner. In addition, only 18 seconds are available for slow motion and rapid motion reproduction of the video information.

German published patent application (OS) 34 27 098 discloses a semiconductor memory with a considerable number of data storage blocks for being written into and read out from in parallel. A parity information storage block is allocated to the data storage blocks for storing parity information under the addresses of the data storage blocks. In this system there is the disadvantage of a high additional storage capacity necessary for protection against errors. The additional storage capacity is commonly referred to as storage redundance and is expressed as a percentage of the non-redundant data storage. In the system just described, error recognition for every 16 stored data bits by means of one parity bit requires a 6.25% storage redundance. Error correcting Hamming codes in which five check bits are needed for every 16 data bits actually require 33% storage redundance.

SUMMARY OF THE INVENTION

It is an object of the present invention to provide a method and circuit apparatus for writing a video signal into a digital semiconductor memory and reading it out therefrom in which errors in the data read out can be recognized without large additional storage for the redundant information necessary for error recognition. A further object of the invention is to make it possible in such a method or apparatus to correct at least some erroneous video data in order to counteract the effects of some random storage failures, for example, damage from alpha radiation. A still further object of the invention is to make possible the keeping a log of the error rate of individual integrated memory circuits in order to identify defective memory circuits and, if desired, to replace them.

Briefly, from the data of a digital video signal, in the active portion of every television line check data are generated according to a Reed-Solomon block code and the check data thus produced are written into a semiconductor memory, line-sequentially with the data of the digital video signal. When the digital video signal data and check data are read out line-sequentially from the semiconductor memory, recognition and/or error correction is carried out when an error is detected. The position of the recognized error in the semi-conductor memory is reported by an accompanying electronic-semi-logic evaluation performed during the error recognition processing.

The invention has the advantage that with line sequential writing in and reading out of a semiconductor memory a low redundance Reed-Solomon block code can be used for error protection and/or error correction. In contrast to known correction methods heretofore used in such semiconductor memory systems, the redundance of the method an apparatus according to the invention is only in the range from 1-2%. With twice that much redundance it is possible to provide also a correction of isolated errors. Furthermore, defective memory circuits can be detected and located.

It is particularly advantageous to provide Reed-Solomon check data only for video data in the active portion of a line for storage in the semiconductor memory. Since the Reed-Solomon check data is then added in the horizontal blanking intervals of the digital video signal, there is no necessity to provide of additional memory circuits in parallel. The circuit configuration of the semiconductor memory can then be identical for any desired storage capacities. The storage capacity can furthermore be varied to provide capability of error correction.

BRIEF DESCRIPTION OF THE DRAWINGS

The invention is further described and its advantages further explained by way of illustrative example with reference to the annexed drawings, in which:

FIG. 4 is a block circuit diagram of a Reed-Solomon coder for both error location and correction of isolated errors in accordance with the invention;

Figure 1:
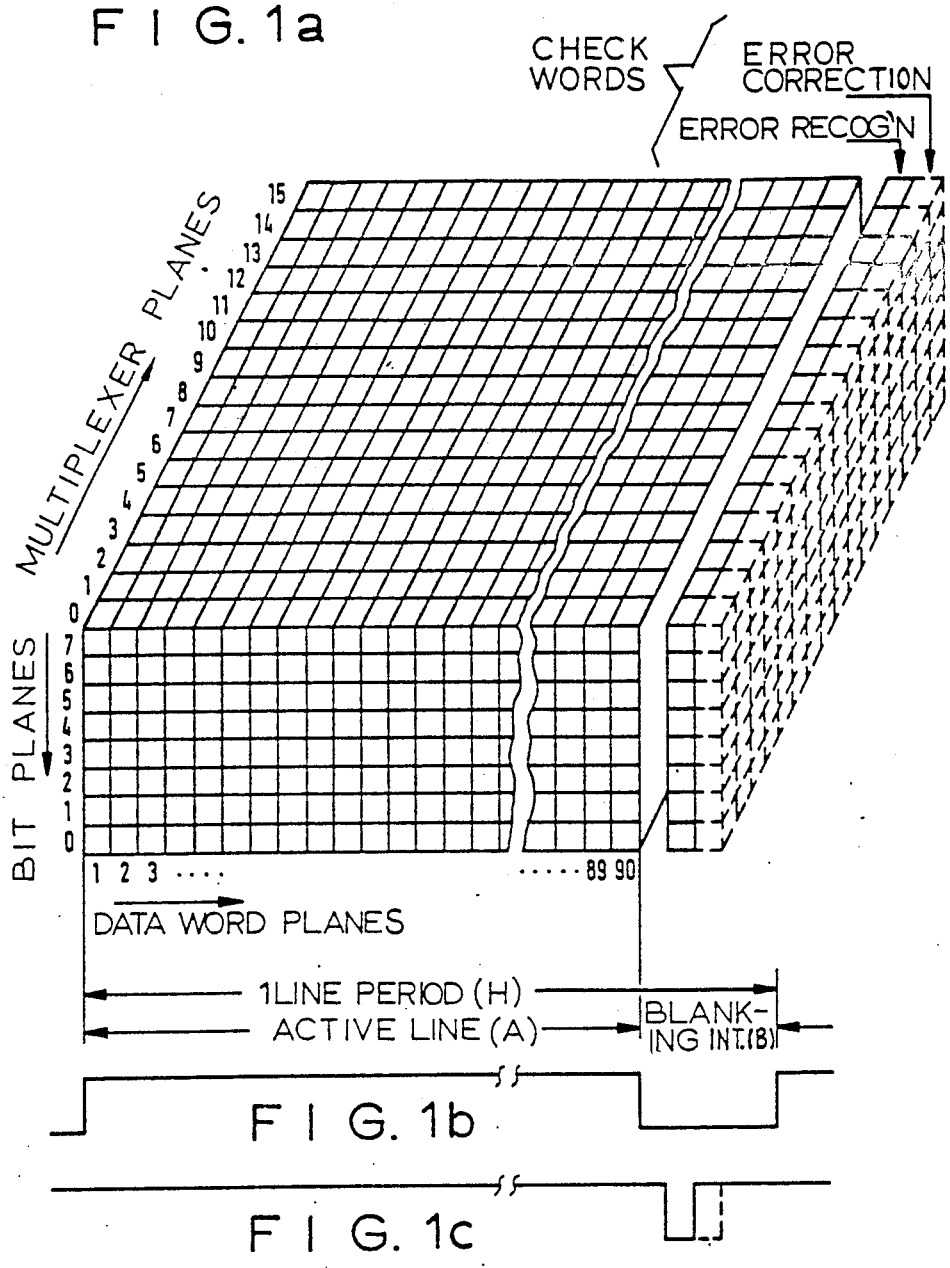
FIGS. 1a, 1b and 1c are a three-dimensional diagram of a digital video line for a semiconductor memory having 16 multiplexer planes, in a system according to the invention.

The term "isolated error" in this context means a single byte error in an otherwise error free subdivision of the data of a television line, or in an otherwise error free television line. In the latter case the expression "single error of a line" is also used herein as an equivalent expression.

DESCRIPTION OF THE ILLUSTRATED EMBODIMENTS

In the embodiments of the invention illustrated in the drawings the data of a digital video signal is to be stored in a semiconductor memory under conditions requiring a memory capacity of about 1.6 gigabytes for a write-in period of one minute. A semiconductor memory of such a size is used for the reproduction of motion in television pictures in slow motion tempo or in rapid motion tempo. In order to limit the circuitry the semiconductor memory is built of highly integrated memory circuits. For example 1 Mbit RAMs or 4 Mbit RAMs. Even then the circuit expense is considerable. When one Mbit RAMs are used 13000 integrated storage circuits needed and even if 4 Mbit RAMs are used, 3300 integrated storage circuits are still needed.

Semiconductor memories have a certain error probability. Although the probability of errors or defects appearing are not as great as in the case of disk memories, it makes sense to provide error detection in memory systems of such magnitude. Furthermore, it has been found useful to correct isolated errors of data resulting from random failures. The semiconductor memory processes digital video signals which are obtained from a digital component interface of the CCIR 601 standard. In this interface eight-bit quantized luminance and chrominance data are transmitted in time multiplex operation with a 27 MHz clock rhythm. The data rate of the data words of a video signal so generated is 27 Mbytes per second. 1440 data words of eight-bits each fall within the active portion of each line. A total of 1536 data words are provided per line.

The 1440 data words of an active line period are distributed among n signal paths. The distribution that subdivides the data words into path groups is performed with a multiplexer. Thus, 1440/n data words are supplied to every single multiplexer plane among the n planes into which the semiconductor memory is subdivided. The data rates are correspondingly reduced from the original 27 Mbytes per second rate to 27/n Mbytes per second.

FIG. 1a shows a distribution of the data of the digital video signal in the active portion of a line period H in the form of a data block. In the veritical direction of the data block, which shows the width of the data words from byte 0 to byte 7, the 8 byte planes are crossed. In the horizontal direction which spreads out the number of data words within the portion of a television line, the respective data word planes are crossed, in the illustrated case 90 planes. In the diagonal direction in which the number of multiplexer planes of the semiconductor memory are spread out, the 16 multiplexer planes are crossed. Thus, of the 1440 data words of the active portion of the line there are 90 data words of 8 bytes each in each multiplexer plane and the number n of the multiplexer planes is 16.

FIG. 1b shows the timewise relation of the data block within a line period H. The line period is subdivided into an active line portion A and a blanking interval portion B.

At the right-hand side of the data block shown in FIG. 1a that portion of the data is shown which serves for error recognition and/or error correction of the video data and is added on to the digital video signal and transmitted in the horizontal blanking interval B. If a semiconductor memory consists of n multiplexer planes, n check words of 8 bytes each are necessary for recognizing location of an error, i.e. one check word is needed for each multiplexer plane for this purpose. If correction of isolated errors is to be carried out, 2 n check words need to be stored for transmission in the horizontal blanking interval B , thus 32 check words in the illustrated case.

The redundance $(16 \times 100)/1440 = 1.11\%$ for error recognition in 16 multiplexer planes. This redundance percentage is doubled to 2.22% if correction is to be provided for isolated errors. The term isolated error means in this case, the presence of a single error in one multiplexer plane. For such error correction only one additional check word needs to be added to the check word for error recognition. Thus, no additional integrated storage circuits operated in parallel are needed in this case, such as are needed for parity words according to the practice heretofore utilizing semiconductor memories.

Figure 2:
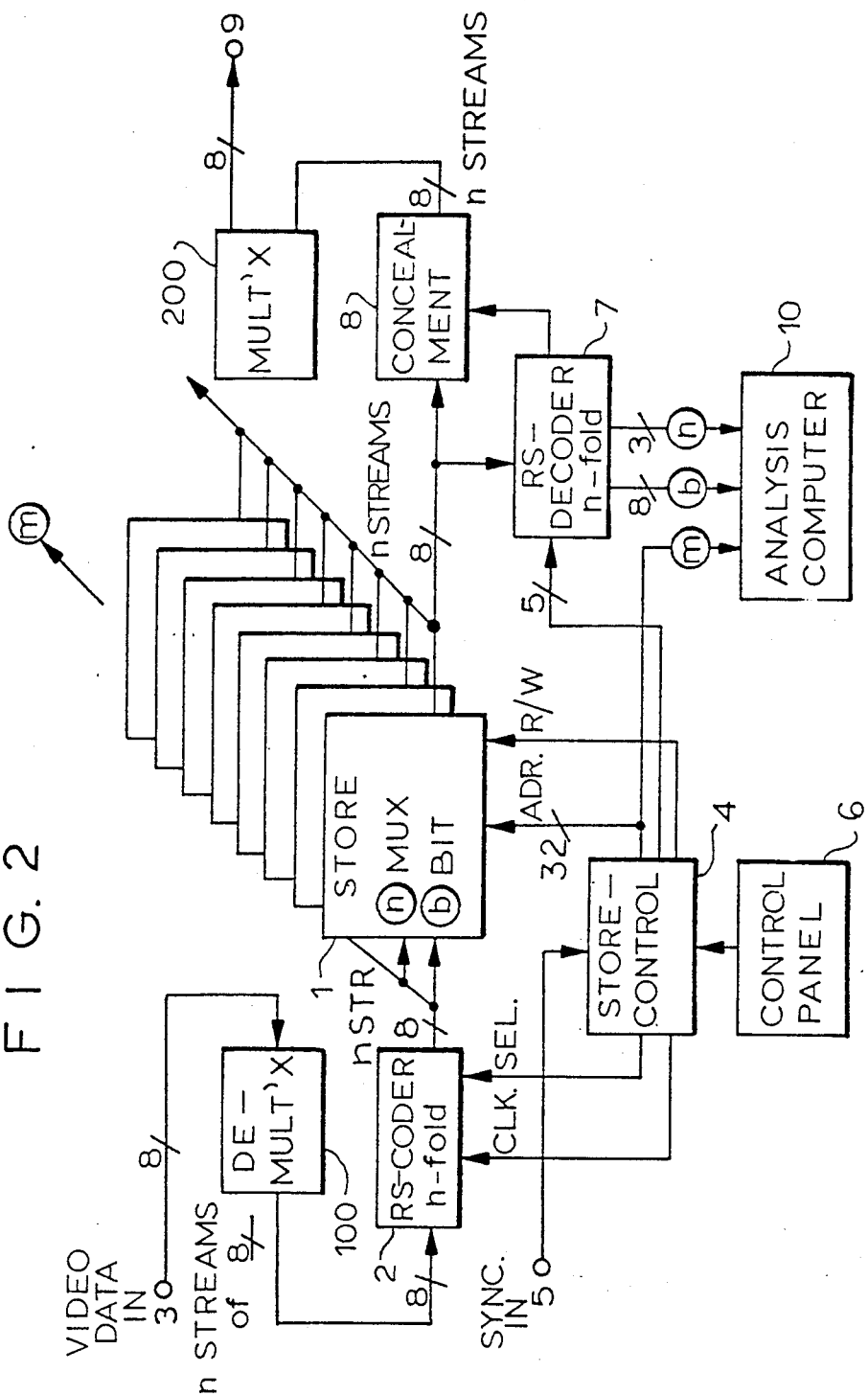
FIG. 2 is a block diagram of a circuit for identifying the position of defective storage cells in a semiconductor memory and for correcting erroneous video data.

FIG. 2 shows the block circuit diagram of a semiconductor memory subdivided into n multiplexer planes. Data of a digital video signal available at a terminal 3 are first subdivided into n data streams for parallel processing in the n memory planes by a time-division demultiplexer 100 to which inputs of n Reed-Solomon coders 2 are connected, through which the n data streams proceed to the semiconductor memory 1. The Reed-Solomon coder shown is separately provided for each of the multiplexer planes, which is indicated in FIG. 2 by labeling the coder 2 as "n-fold". It is further described in FIGS. 3 and 4. At this point it needs to be mentioned that in the Reed-Solomon coder, check words for error recognition and/or correction are derived which are added to the data of the digital video signal and transmitted in the horizontal blanking intervals B. The demultiplexer 100 is controlled by a control unit 4.

The data thus provided with check words are line-sequentially written into the semiconductor memory 1 and then read out of the semiconductor memory a manner controlled by the control unit 4. A number of control signals, for example, clock, selection, address, read-write and reset signals, are generated which are derived from a synchronizing signal that is made available at a terminal 5. The signals just mentioned can be generated, for example, by applying frequency multiplication to the synchronizing signal and then providing appropriate logic correlations. Particular function in read out (e.g. slow motion, rapid motion, etc.) provided by the control unit 4 can be selected on a control panel 6, where setting controls are provided not only for selecting slow motion or rapid motion operation, but among other things, the start and stop times for particular scenes and the running rates of slow or rapid motion.

A Reed-Solomon decoder 7 and an error concealment unit 8 both have their inputs connected to an output of the semiconductor memory 1. The Reed-Solomon decoder 7 is further described below. When erroneous data are recognized in the signal read out from the semiconductor memory 1, the Reed-Solomon decoder 7 provides signals which show the position in the bit plane b and in the multiplexer plane n of the erroneous data in the semiconductor memory 1. An additional signal of the Reed-Solomon decoder 7 activates the error concealment unit 8 when the decoder determines presence of an uncorrectable error. The construction and manner of operation of circuits for concealment of errors in digital signals are in themselves known, so that further explanation thereof are not necessary here. The n data streams are recombined by a multiplexer 200 controlled by the control unit 4.

The output of multiplexer 200 is connected to the terminal 9 where the digital video signal read out word by word in bit parallel form is made available for further signal processing stages. By means of the address signal which identifies the data word m in a multiplexer plane and the signals b and n for the position of the erroneous data in terms of the bit and multiplexer planes, the specific integrated memory circuit which has caused the recognized error to be produced can be identified by means of the analysis computer 10. At the same time it can also be determined whether only single bit errors or multiple bit errors have been recognized in the read out data signal.

Figure 3:
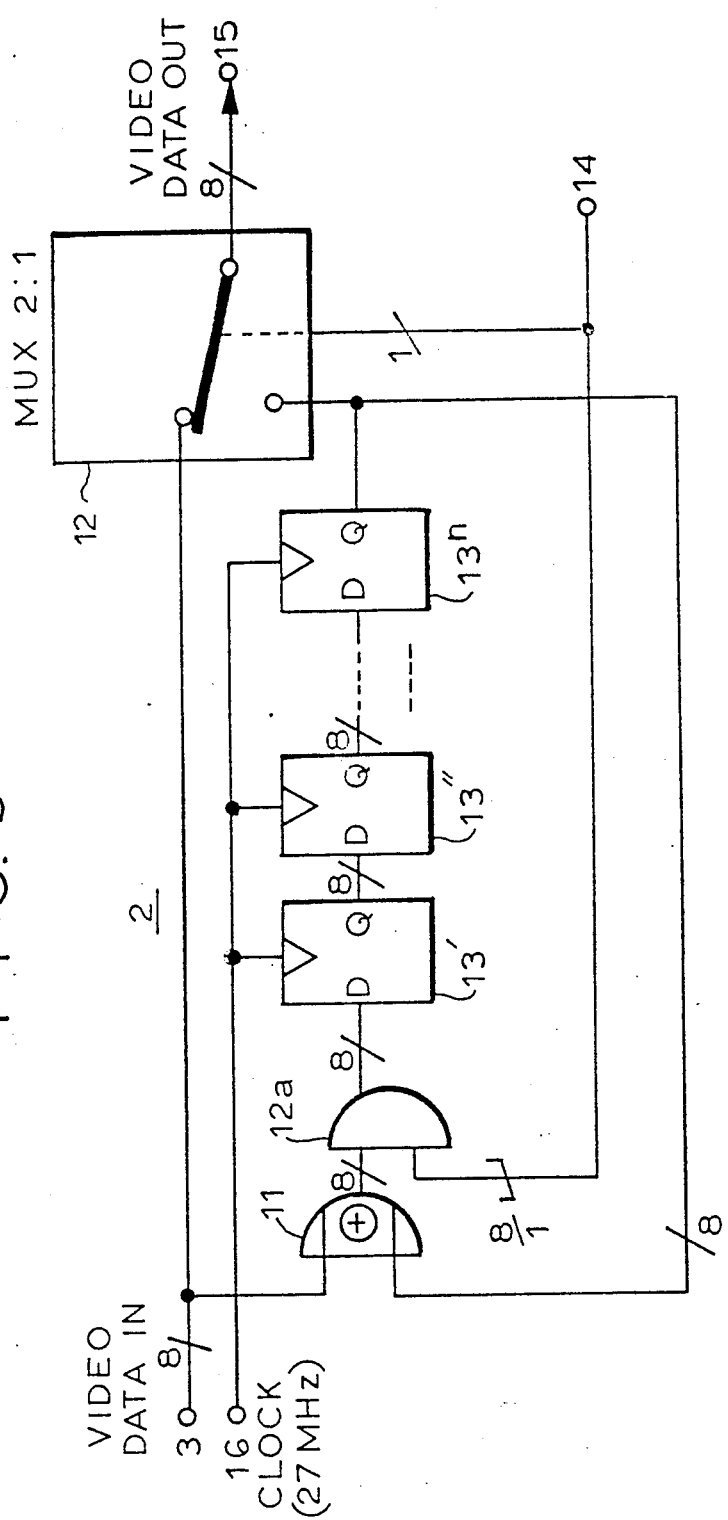
FIG. 3 is a block circuit diagram of a Reed-Solomon coder for error detection and location in accordance with the invention.

FIG. 3 shows the circuit diagram of a Reed-Solomon coder for recognizing errors of the data read out from the semiconductor memory 1. Reed-Solomon coders and decoders are known from the book "Practical Error Correction Designed for Engineers", 1982, Data Systems Technology Corp.. The input digital video signal supplied from the terminal 3 through an 8-bit parallel transmission line to the Reed-Solomon coder 2. The data of the digital video signal proceed respective inputs of an exclusive-OR gate and a multiplexer 12. The output of the exclusive-OR gate 11 connected with one input of AND gate 12a. From the output of the AND gate 12a the video data proceed to an n-stage shift register 13', 13''. . . 13$^n$. The signal from the output of the n-stage shift register supplied to a second input of the exclusive-OR gate 11 and also to a second input of the multiplexer 12. The control of the switching of the multiplexer 12 is performed in response to a selection signal which is made available at a terminal 14 and which is generated by the control unit 4 of FIG. 2. This selection signal is also supplied to a second input of the AND gate 12a.

FIG. 1c shows the time relation of the selection signal to the digital signal. At the terminal 15, which is connected to the output multiplexer 12 a bit-parallel digital video signal is made available for the semiconductor memory 1.

The Reed-Solomon coder 2 illustrated in FIG. 3 operates basically as a parity generator. The data shifted through the n-stage shift register first pass through the exclusive-OR gate 11 to the input of the shift register after being subjected to an exclusive-OR correlation with the output of the shift register. During the active line period A the incoming video data is put through directly to the output terminal 15 by the multiplexer 12, but during the blanking interval B the multiplexer switches over to connect the coder output to the output of the n-stage shift register, thereby allowing the generated check word to be inserted into the digital video signal during the horizontal blanking interval. The clocking of the n-stage shift register is performed by a clock signal made available at a terminal 16. A Reed-Solomon coder 2 of the kind shown in FIG. 3 is provided individually for each multiplexer plane.

The Reed-Solomon coder illustrated in FIG. 4 generates not only a check word for error recognition but also an additional check word for correcting isolated errors. This Reed-Solomon coder constructed similarly to the coder shown in FIG. 3. The input digital video signal, again supplied at the terminal 3 proceeds to one input of the multiplexer 12 and to one input of an exclusive-OR gate 11. For the output signal of the n-stage shift register 13'-13n supplied to another input of the multiplexer 12, the data signal available at the output of the exclusive-OR gate 11 again goes to one input of the AND gate 12a to which the collection signal 14 for the multiplexer 12 is supplied at another input, that the output signal the AND gate 12a in this case goes to the address inputs of two read-only memories (ROM) 17 and 18.

The output signal of the ROM 17 goes to the input of the n-stage shift register 13 through an exclusive-OR gate 19 having three inputs. Another input of the exclusive-OR gate 19 is connected to the output of another n-stage shift register 14',14$^n$ of which the input is connected to the output of the ROM 18. Both shift registers are clocked by the clock signal made available at the terminal 16. The switching of the multiplexer 12 is again controlled by the selection signal the terminal 14 (FIG. 1c). With regard to the truth tables stored in the ROMs 17 and 18, reference is again made to the book "Practical Error Correction Design for Engineers" cited above for details.

In the case of the Reed-Solomon coder FIG. 4 as in the case of the coder of FIG. 3, a separate set of registers 13',13$^n$ and 14',14$^n$ is to be provided for each multiplexer plane.

Figure 5:
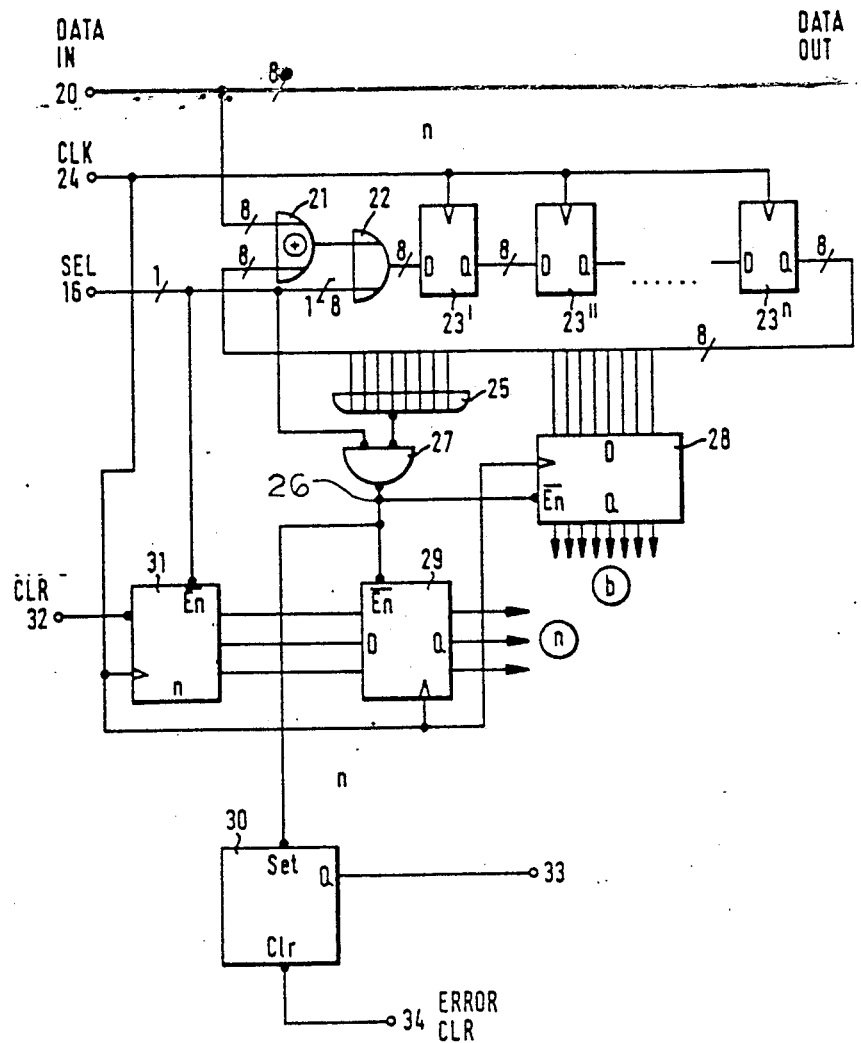
FIG. 5 is a block circuit diagram of a Reed-Solomon decoder for detection and location of errors in data read out from a semiconductor memory in accordance with the invention and FIG. 6 is a block circuit diagram of a Reed-Solomon decoder for both error detection and correction of isolated errors in accordance with the invention.

FIG. 5 shows a Reed-Solomon decoder 7 for recognition of data errors in the data signal read out of the semiconductor memory 1. The read out data signal supplied from a terminal 20 to one input of an exclusive-OR gate 21, the output of which proceeds to one input of an AND gate 22, the output of which is supplied to an n-stage shift register 23',23'' . . . 23$^n$. The output signal of the n-stage shift register is fed back to a second input of the exclusive-OR gate 21 and through the AND gate 22 to the input of the n-stage shift register. The clocking of the n-stage shift register 23', 23'' . . . 23$^n$ is performed by a clock signal supplied at a terminal 24.

The 8-bit parallel output signals of the n-stage shift register pass through a multiple-OR stage 25 and are logically correlated to a selection signal available at a terminal 26 by means of an AND gate 27. The signal available at the output of the AND gate 27 serves to set a register 28, ,a register 29 and a flip-flop 30. The register 28 has its input likewise connected to the output signals of the n-stage shift register 23',23'' . . . 23$^n$.

The signal b designating the position of an error in the bit plane is obtainable at the output the storage register 28. For determining the position of an error in a multiplexer plane, a counter 31 counts out the multiplex planes modulo-n. When an isolated error is recognized the count value of the counter 31 at that moment is intermediately stored in the storage register 29. The counter 31 is reset by a reset signal appearing at a terminal 32 and is advanced by the clock signal available at the terminal 24. Isolated recognized errors can be intermediately stored further in the flip-flop 30 for purposes of their time relation to the data signal. An alarm signal for the analysis computer n or for the error concealment unit 8 is available at a terminal 33. The resetting of the flip-flop 30 results from a reset signal from the terminal 34.

The Reed-Solomon decoder shown in FIG. 5 recognizes errors in the read-out data signal when a syndrome presented by the several stages of the shift-register 23',23" . . . 23$^n$ is unequal to 0. The signal designating this condition is available at the output of the AND gate 27. The syndrome shows the bit position of the recognized error by a logic-1 level. An error location per video line can be stored with the Reed-Solomon decoder of FIG. 5. As a rule one error recognition per line is sufficient for semiconductor memories of such large storage capacity. It is possible to locate a defective integrated storage circuit by means of the analysis computer 10 from the stored bit position b, the multiplexer plane n and a value provided by the control unit 4 which determines the position along the picture storage side m (see data block illustration in FIG. 1 and FIG. 2).

Figure 6:
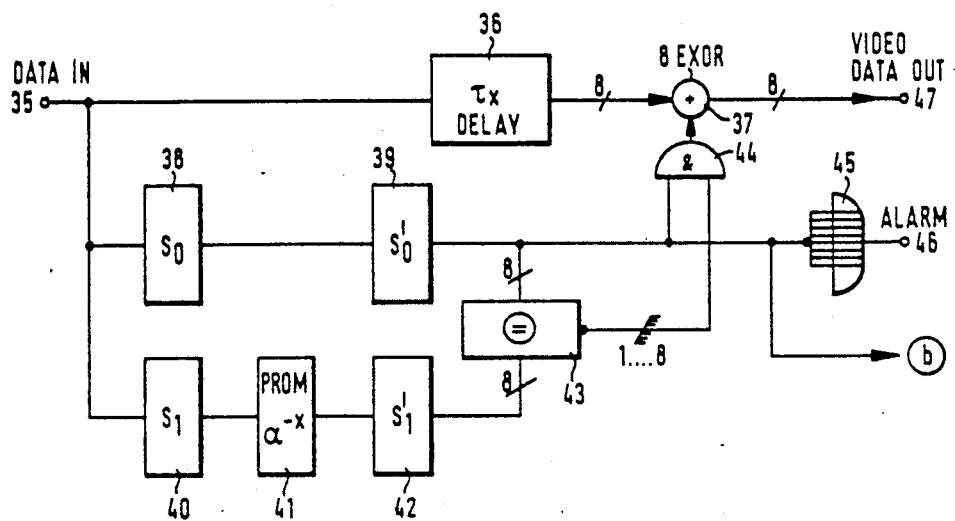

For more expensive applications of such semiconductor memories it is possible by operating with another embodiment of a Reed-Solomon decoder 7 to provide also a correction of a recognized isolated error. FIG. 6 shows a corresponding Reed-Solomon decoder for both error recognition and individual error correction, which is suitable for a semiconductor memory configuration according to the invention. The data signal read out of the semiconductor memory 1 is supplied from a terminal 35 through a register 36 to one input of an exclusive-OR gate 37. This read out data signal is also put through serially connected syndrome generators 38 and 39 as well as a series circuit of a syndrome generator 40, a read-only memory 41 and a syndrome generator 42. The output signals of the syndrome generators 39 and 42 are compared in a comparator 43, the output of which proceeds through an AND-gate 44 to another input of the exclusive-OR gate 37. The output signal of the syndrome generator is also supplied to another input of the AND-gate 44.

An error recognizing alarm signal for the terminal 46 is derived by OR correlation by means of a multiple OR gate 45 for the 8 bits of the output signal of the syndrome generator 39. The output signal of the syndrome generator 39 produces the error signal recognition in the bit plane. At the output of the exclusive-OR gate 37 which is provided to the terminal 47 is made available the video signal corrected for a single byte error.

Reed-Solomon decoders for correcting single byte errors are in themselves known. Their basic construction and manner of operation are described in the already mentioned "Practical Error Correction Design for Engineers" as well as in the copending application of the present applicant, U.S. Ser. No. 198,131, filed May 24, 1988, so that the detailed explanation of the operation of FIG. 6 is not necessary here.

It will be understood that the subdivision of a semiconductor into "planes" each receiving a different data stream is conceptual rather than physical, although it is actually a subdivision. The use of 13000 1 Mbit RAMs or 3300 4 M bit RAMs, as previously mentioned, constitutes a physical subdivision of the memory. The memory subdivision for receiving subdivisions of the data stream may appropriately be referred to as an at least conceptual subdivision into planar arrays of (multbit) words.

Although the invention has been described with reference to particular illustrative embodiments, it will be understood that modifications and variations are possible within the inventive concept.

I claim:

1. Method of writing active video data of a digital video signal contained in active portions of said video signal into a digital semiconductor memory composed of a multiplicity of integrated semiconductor storage unit components and subsequently reading said data out of said memory, comprising the steps of:
    deriving check data by means of a Read-Solomon-block code from active video data of the active portions of said video signal;
    adding said derived check data to the active video data by inserting said derived check data between successive active portions of said video signal;
    line-sequentially writing said active video data and derived check data derived therefrom and added thereto into said semiconductor memory;
    reading said active video data and check data, as added together, out of said semiconductor memory;
    subjecting the data read out of said memory to Read-Solomon decoding for recognition of errors in said read-out active video data and correcting correctable errors of said read-out active video data, and
    performing a logical analysis associated with the Reed-Solomon decoding and thereby determining locations of respective integrated semiconductor storage unit components in said semiconductor memory to which respective recognized errors of read-out active video data relate.

2. Method according to claim 1, wherein only said active video data of active video signal portions and said check data derived therefrom are written into said semiconductor memory.

3. Method according to claim 2, wherein said semiconductor memory, is at least conceptually, subdivided into n planar arrays of words and wherein for writing into, and reading out from said n planar arrays, the active video data and check words of said digital signal are subdivided into n data streams.

4. Method according to claim 3, wherein n Reed-Solomon coders (2) are provided for performing the step of deriving check works and n Reed-Solomon decoders (7) are provided for performing error recognition and correction of correctable errors for said respective n data streams.

5. Method according to claim 4, wherein error recognition is performed by storing n feedback signals of n respective Reed-Solomon decoders (7) and determining error position in bit-planes (b) of active video data words, by counting a signal designating the position of check data to show the error location (n) in one of said n planar arrays, and by means of information from a memory control unit (4) designating a work position (m) defined by order of words in said n data streams written into and read out from said n planar arrays of said memory and providing a bit plane designation (b) for defining a bit-plane in which an error position is being determined, and wherein said bit plane designation (b), said planar array designation signal count (n) and said data stream word position designation (m) are used to determine, by a computer (10), the identification of a specific one of said integrated semiconductor storage unit components of said memory which is responsible for a recognized error.

6. Method according to claim 1, wherein upon overloading of the error correction step, resulting from detection of the presence of a plurality of errors, the data signals read out from said semiconductor memory are subjected to digital processing for concealing recognized errors.

7. Apparatus for writing active video data of a digital video signal into a digital semiconductor memory which memory comprises a multiplicity of integrated storage unit components and for reading said data out of said memory, comprising:

control means (4) for subdividing said memory addresswise into n at least conceptually planar arrays of word storage locations and for writing into said memory and reading out of said memory n streams of digital data;

demultiplexer means (100) for subdividing said digital video signal into n separate data streams for writing active video data thereof respectively into sand n planar arrays of word storage locations;

n Reed-solomon coders (2) interposed in said n data streams between said demultiplexer means (100) and said memory (1) for adding check words to follow data words of a preceding television line of active video data of said video signal in said respective n data streams;

n Reed-Solomon decoders (7), respectively having inputs connected to outputs of said memory for said n data streams, for locating errors and correcting correctable errors of data of said video signal in said respective n data streams read out from said memory by said control means (4);

multiplexer means (200) for recombining said n data streams into a single data stream, and analysis computer means (10) connected to said n decoders and to said control means for identifying a said semiconductor component of said memory responsible for an error recognized by a said decoder.

8. Apparatus according to claim 7, further comprising, in said Reed-solomon coders:

one series connection of a sequence of n first storage shift registers (13) for each combination of one of said n planar arrays and one of p bit levels of said data words in said planar arrays, said first storage shift registers (13) all being connected for receiving a clock signal, each said sequence of n series-connected first storage shift registers (13) being connected for receiving one of said n data streams of said digital video signal and having a feedback connection through a first input of a first exclusive OR gate (11) having two inputs and through a first input of a first AND gate (12a) having two inputs, a second input of said exclusive OR gate being connected for receiving data of a data stream of said digital video signal and a second input of said AND gate being connected for receiving a signal indicating durations of blanking intervals produced by a horizontal blanking signal derived from said video signal, and selector switch means (12a) controlled by a source of said signal indicating durations of blanking intervals for selection between each data stream of said digital video signal, as provided to each of said sequence of n registers (13), and check data for recognition of errors in the same data stream of said digital video signal, said check data for each said data stream being provided at the output end of the respective one of said sequences of n storage shift registers.

9. Apparatus according to claim 8, wherein there are provided, in said Reed-Solomon coders, for each combination of one of said n planar arrays and one of p bit levels of data words in said planar arrays also one series connection of a second sequence of n series-connected second storage shift registers (14) all of which are connected for receiving a clock signal, wherein each sequence n said series-connected first storage shift registers (13) and a sequence of said series-connected second storage shift registers relating to the same planar array and bit level are in each case connected with each other by a second exclusive OR gate (19), wherein also each said pair of connected sequences respectively of n first storage shift registers and n second storage shift registers thus constituted has a feedback through a first input of said first exclusive OR gate (11) and through a first input of said first AND gate (12a) as well as through first and second read-only memories (17, 18) which are connected for being addressed in parallel, a second input of said first AND gate (12a) being connected for receiving said signal indicating durations of blanking intervals, said selector switch means (12) being connected for selecting, in response to said signal indicating durations of blanking intervals, between a said data stream of said digital video signal and check data available at the output end of a said series connection of second storage shift registers (14), for error recognition and error correction.

10. Apparatus according to claim 7, wherein for decoding error recognition in the data read out of said semi-conductor memory (1) there is provided, in said Reed-Solomon decoders, for each combination of one of said n planar arrays and one of p bit levels of data words in said arrays, a series connection of a sequence of n first storage shift registers (23) all of which are connected for being clocked by a clock signal, wherein each said sequence of n first storage shift registers (23) is supplied at an input end thereof with one of said n data streams of said digital video signal and is provided with feedback through a first input of an exclusive OR gate (21) and through a first input of an AND gate (22), said exclusive OR gate having a second input through which data of said one of said n data streams of said video signal read out of said semi-conductor memory are supplied to said input end of said register sequence and said AND gate having a second input to which a signal indicating durations of blanking intervals is supplied, and wherein a sequence of n second storage shift registers (28) is provided for storage of fedback signals of each sequence of said first storage shift registers, at the output of which sequence of second registers (28) signal designating errors in said respective bit levels of a data word are available, and an analysis computer (10) is provided for processing said signals designating errors, and wherein additional AND gates (27) are provided for deriving a set signal, wherein also fedback signals generated in said first storage shift registers (23) after being OR correlated in an OR gate (25) are supplied to said additional AND gates (27) which are also connected for receiving said signal indicating durations of blanking intervals, and wherein n counters (31) having clock and reset inputs are provided with clock signals, a reset signal and said signal indicating durations of blanking intervals, and wherein a series-connected sequence of n third storage shift registers (29) is provided for each said sequence of second storage shift registers (28), the inputs of which third registers (29) are connected with respective outputs of said n counters (31) and the outputs of which third registers (29) make available signals for recognizing a particular error-containing planar array, for supply of an error-containing-array-recognizing signal to said analysis computer (10).

11. Apparatus according to claim 10, wherein a flipflop (30) is provided, in said Reed-Solomon decoders, having inputs to which said set signal and said reset signal are respectively supplied and wherein an output from which a said signal recognizing a said error-containing array is available is connectable to said analysis computer (10) for causing a said data stream to be processed, when an uncorrectable error is found to be present, in means for error concealment under control of said flipflop.

12. Apparatus according to claim 7, wherein for decoding, with error recognition and correction, the data read out from said semiconductor memory, there are provided for each combination of one of said n planar arrays and one of p bit levels of data words in a said planar array, a multi-stage storage shift register (36) having x stages where x is the sum of n and quotient of the number of data words per line in said video signal divided by n, first and second syndrome generators (38, 39) being connected in a first series circuit and a third syndrome generator (40), read only memory (41) and fourth syndrome generator (42) being connected in a second series circuit, a comparator (43) in each case being provided having inputs connected to outputs of said second and fourth syndrome generators (39, 42), AND gates (44) being provided having inputs connected with outputs of said second syndrome generators (39) and the outputs of said comparators (43), and wherein exclusive OR gates (37) are provided with inputs connected to respective outputs of said multi-stage storage shift register (36) and with respective outputs of said AND gates (44), data corrected for individual isolated errors being thereby made available at said outputs of said AND gates (44), and wherein at the output of said second syndrome generators (39) errors and signals designating bit levels thereof are supplied to an OR gate (45), at the output of which an error recognizing signal is available for control of means (8) for error concealment.

* * * * *